United States Patent
Sturges et al.

(10) Patent No.: US 7,047,399 B2
(45) Date of Patent: May 16, 2006

(54) COMPUTER SYSTEM AND METHOD FOR FETCHING, DECODING AND EXECUTING INSTRUCTIONS

(75) Inventors: Andrew C. Sturges, Montpelier (GB); Nathan M. Sidwell, St. Werburghs (GB)

(73) Assignee: SGS-Thomson Microelectronics Limited, Almondsbury (GB)

( * ) Notice: Subject to any disclaimer, the term of this patent is extended or adjusted under 35 U.S.C. 154(b) by 0 days.

(21) Appl. No.: 09/842,312

(22) Filed: Apr. 25, 2001

(65) Prior Publication Data

US 2002/0078330 A1 Jun. 20, 2002

Related U.S. Application Data

(63) Continuation of application No. 09/356,122, filed on Jul. 16, 1999, now abandoned, which is a continuation of application No. 08/493,103, filed on Jun. 21, 1995, now Pat. No. 5,961,637.

(30) Foreign Application Priority Data

Jun. 22, 1994 (GB) .................................... 9412487

(51) Int. Cl.
*G06F 9/38* (2006.01)

(52) U.S. Cl. ...................... 712/235; 712/207; 712/237

(58) Field of Classification Search ................ 712/205, 712/206, 207, 235, 237, 238
See application file for complete search history.

(56) References Cited

U.S. PATENT DOCUMENTS

| | | | | |
|---|---|---|---|---|
| 3,426,330 A | * | 2/1969 | Marx et al. ................. | 712/207 |
| 3,551,895 A | * | 12/1970 | Driscoll, Jr. ................ | 712/237 |
| 3,573,854 A | * | 4/1971 | Watson et al. ............... | 712/237 |
| 3,577,189 A | * | 5/1971 | Cocke et al. ................ | 712/219 |
| 4,742,451 A | * | 5/1988 | Bruckert et al. ............ | 712/207 |
| 4,974,155 A | | 11/1990 | Dulong et al. | |
| 5,615,386 A | | 3/1997 | Amerson et al. | |
| 5,961,637 A | * | 10/1999 | Sturges et al. .............. | 712/235 |

FOREIGN PATENT DOCUMENTS

| | | |
|---|---|---|
| EP | A-0 355 069 | 2/1990 |
| EP | A-0 219 203 | 2/1995 |

OTHER PUBLICATIONS

Hamacher, V. Carl, Vranesic, Zvonko G., Zaky, Safwat G., Computer Organization, $2^{nd}$ edition, McGraw-Hill Book Company, 1984, pp. 22.*

(Continued)

*Primary Examiner*—Richard L. Ellis
(74) *Attorney, Agent, or Firm*—Lisa K. Jorgenson; Daniel P. McLoughlin; Wolf, Greenfield & Sacks, P.C.

(57) ABSTRACT

A computer system for executing branch instructions and a method of executing branch instructions are described. Two instruction fetchers respectively fetch a sequence of instructions from memory for execution and a sequence of instructions commencing from a target location identified by a set branch instruction in a sequence of instructions being executed. When an effect branch signal is generated, the target instructions are next executed, and the fetcher which was fetching the instructions for execution commences fetching of the target instructions.

The effect branch signal is generated separately from the set branch instruction.

In another aspect, the effect branch signal is generated on execution of a conditional effect branch instruction, located at the point in the instruction sequence where the branch is to be taken.

23 Claims, 9 Drawing Sheets

OTHER PUBLICATIONS

European Search Report from United Kingdom Patent Application No. 9412487.2, filed Jun. 22, 1994.

International Journal Of Mini And Microcomputers, vol. 11, No. 1, 1989, Calgary, California US, pp 13-17. Cortadella and Llaberia "Making Branches Transparent To the Execution Unit".

Proceedings 4th MIT Conference: Advanced Research In VLSI, Apr. 7, 1986, Cambridge, MA, US pp 73-88, Plaszkun and Farrens "An Instruction Cache Designs For Use With a Delayed Branch".

IBM Technical Disclosure Bulletin, vol. 14, No. 2, May 1972, New York, US, pp 3599-3611, Beebe et al, "Instruction Sequencing Control".

Computer Architecture: A Quantitative Approach, David A. Patterson, et al., pp. 265-270 (Chapter 6, Sectopm 4), no date provided.

* cited by examiner

COMPUTER SYSTEM AND METHOD FOR FETCHING, DECODING AND EXECUTING INSTRUCTIONS

FIELD OF THE INVENTION

This invention relates to a computer system for executing branch instructions and to a method for operating such a computer system.

BACKGROUND TO THE INVENTION

Programs consist of blocks or strings of sequential instructions, which have a single entry point (the first instruction) and a single exit point (the last instruction). There are one or two choices of instruction blocks to be executed after any particular block. When there are two possible blocks, a condition must be used to determine which block to choose. The pattern of links between blocks is called the program's control or flow graph.

These blocks of instructions are packed together in memory. When there is no choice of subsequent block (block B), it can normally be placed immediately after the first block (block A). This means that there need not be any explicit change in control to get from block A to block B. Sometimes this is not possible, for instance, if more than one block has block B as a successor. All but one of these predecessors must indicate that the subsequent block will not be the next sequential block, but block B. These are unconditional branches. Some blocks have a choice of successor blocks. Clearly only one of the successors, for example block B, can be placed sequentially afterwards. The other block, block C, is indicated explicitly within block A. A conditional mechanism is used to determine which block is to be chosen. If the condition is met, then the chosen successor block is block C. If the condition is not met, then the chosen successor is block B. These are conditional branches.

Branches are well known in the art and are essential for a computer system to execute any program. Known computer systems contain a special register, the instruction pointer register, which provides an indication of the address of the next instruction to execute. This register is usually automatically incremented after an instruction executes, so that it now indicates the address of the next sequential instruction. Branch instructions are used to change this behaviour. These branch instructions specify an alternative address (the target location) for the next executable instruction. Conditional branch instructions also specify a condition which must be met for the alternative address to be used—otherwise the instruction pointer will be incremented as usual. These branch instructions thus define the end of a block of instructions.

In a non-pipelined computer system, the computer fetches, decodes and executes to completion one instruction, before moving on to the next instruction. However, in a pipelined system where fetch, decode and execution stages can all operate simultaneously on a stream of instructions, it is possible to fetch instructions which are not required. For instance, consider a system with a four stage instruction pipeline with fetch, decode, execute and write stages. The earliest that a branch instruction can be detected is in the decode stage, by which time the next sequential instruction in memory will have already been fetched. For an unconditional branch this must be thrown away, and new instructions fetched from the target location. For conditional branches it is more complicated. The condition must be evaluated to determine whether or not to change to the target location. This will occur in the execute stage, thus the sequentially fetched instruction must be stalled in the fetch stage, and only after the branch has been executed can the pipeline proceed. If the condition was true, then the sequentially fetched instruction must be ignored, and new instructions fetched from the target location. The first pipelining applied to any processor architecture is to issue instructions in advance, as this is one of the easiest speed-ups.

From the previous description, it is clear that the instruction after a branch instruction is always fetched, but is only sometimes required, and that therefore a pipeline bubble is created while determining what to do. An attempt has been made to improve this by changing the semantics of branch instructions, so that the subsequent instruction is always executed and the branch determines whether the instruction executed after that one is the one sequentially after it, or the instruction at the target location. These are called delayed branches, and the instruction immediately following the branch instruction is called a branch delay slot. FIG. 1 illustrates schematically this operation. The branch instruction is detected in the decode stage. The branch delay slot is Inst 1, which is always executed. If the branch is taken, then the next executed instruction will be Inst D0 being the first instruction of a different block, whereas if the branch is not taken, it will be Inst 2 which is the first instruction of the next sequential block. Inst 1 must be an instruction which can always be executed, regardless of the outcome of the (conditional) branch, and it must not be an instruction which determines whether the conditional branch is to be taken. If no instruction can be found within the program which satisfies these conditions, then an instruction which has no effect (NO OP) must be inserted instead.

Pipelines can be designed where the optimum number of delay slots is more than one. The more deeply pipelined a computer is, the more delay slots are generally required. Unfortunately, it gets harder and harder to find useful instructions to put in each additional slot, so many of them are filled with instructions which do nothing. This places large bubbles of NO OP instructions in the execution pipeline, thus reducing the speed advantage obtained by making a deep pipeline.

Another significant problem with this approach is that when a new computer system of an existing instruction set is designed, with a new pipeline organization, and therefore a different number of branch delay slots, it cannot execute existing binaries. Programs must be recompiled in order to be executed.

In an attempt to dispense with branch delay slots, one known system uses two instruction fetchers at the fetch stage of a pipeline, each instruction fetcher being capable of fetching and holding a sequence of instructions. One instruction fetcher has associated with it local decode circuitry which is arranged to detect branch instructions. It will be appreciated that this local decode circuitry is in addition to the normal decode stage of the pipeline. When a branch instruction is detected by the active fetcher it initialises the other instruction fetcher to start fetching instructions from the new block while the instructions up to the branch instruction of the first block continue to be passed into the pipeline for decoding and execution. Not only does this system require extra local decode circuitry to detect branch instructions prior to the normal decode stage of the pipeline, but it also involves speculative fetching of instructions from the memory, many of which may not be required.

EP-A-355069 (Evans & Sutherland Computer Corporation) defines a system in which there is separation of the instruction to effect a branch into two different parts. The set branch instruction indicates the target location for the branch and can be placed as near the beginning of the string of instructions as possible.

Actual implementation of the branch is carried out later in response to a split bit located. in a later instruction.

The provision of the target location for the branch with the set branch instruction provides an early indication of the fact that a memory access is going to be made (or is likely to be made) and provides the memory address (the target location) for that access. When the split bit causes the branch to be taken, and the time comes therefore to access that memory address, the system has had a chance to set up for the access, for example by bringing the necessary data into a local cache.

One problem associated with the system of EP-A-355069 is that the target location from which new instructions are fetched is reset after a split bit signal has been executed. This means that there cannot be multiple branches using the target location set up by a single set branch instruction. It is advantageous to allow for this situation and it is one object of the present invention to provide an improved system for implementing branches allowing for this.

SUMMARY OF THE INVENTION

According to one aspect of the present invention, there is provided a computer system for fetching, decoding end executing instructions comprising storage circuitry for holding a plurality of instructions at respective storage locations, said plurality of instructions being arranged in instruction strings, each string comprising a first instruction and a set of subsequent instructions, instruction fetch circuitry for fetching a sequence of instructions from said storage circuitry and including an indicator for providing an indication of a next address at which a next fetch operation is to be effected, execution circuitry for executing fetched instructions, wherein at least some of said instruction strings each includes a set branch instruction (SET) which provides an indication of a target location from which a subsequent instruction may be fetched, the subsequent instruction being from a different instruction string, and wherein said instruction fetch circuitry is operated responsive to execution of a said set branch instruction (SET) to fetch in parallel subsequent instructions from said string containing said set branch instruction and new instructions from said different instruction string commencing from said target location while said subsequent instructions continue to be executed. The computer system further comprises a target store for holding the indication of said target location, said indication being loaded into said store on execution of said set branch instruction (SET) and being held in said store as a valid indication until execution of a subsequent set branch instruction and select circuitry responsive to generation of an effect branch (DO) signal indicative that further instructions to be executed are said new instructions, to cause said execution circuitry to execute said new instructions and to cause said instruction fetch circuitry to fetch again new instructions commencing from said target location.

The invention also provides a method of operating a computer to fetch decode and execute instructions which computer has storage circuitry holding a plurality of instructions at respective storage locations, said plurality of instructions being arranged in instruction strings, each string comprising a first instruction and a set of subsequent instructions. The method comprises fetching a sequence of instructions from said storage circuitry and providing an indication of a next address at which a next fetch operation is to be effected, decoding said instructions, and executing each instruction in turn, wherein at least some of said instruction strings each include a set branch instruction (SET) which provides an indication of a target location from which a subsequent instruction may be fetched, the subsequent instruction being from a different instruction string. The method further comprises, on execution of said set branch instruction, holding the indication of said target location in a target store as a valid indication until execution of a subsequent set branch instruction, fetching in parallel subsequent instructions from the string containing said branch instruction and new instructions from said different instruction string commencing from said target location, continuing to execute said subsequent instructions until an effect branch signal is generated which indicates that further instructions to be executed are said new instructions, and responding to said effect branch signal by commencing execution of said new instructions and fetching again new instructions commencing from said target location.

In one embodiment, said instruction fetch circuitry comprises two instruction buffers, a first buffer for holding subsequent instructions connected to said execution circuitry, and a second buffer for holding new instructions wherein the contents of said second buffer are copied into said first buffer responsive to generation of said effect branch (DO) signal.

In the described embodiment said instruction fetch circuitry includes two instruction fetchers for fetching respectively said subsequent instructions and said new instructions and wherein said select circuitry is operable to connect a selected cone of said instruction fetchers to said execution circuitry.

In the simplest case, the target store can hold the memory address of the target location. To allow kernel entry, the set branch instruction can identify the target location using an implicit value which addresses a special register holding the memory address of the new instructions.

To allow descriptor branches to be executed, the target store can hold a pointer to a memory location which contains the memory address of the target location.

The effect branch signal is generated when the branch point, at which the branch is to be taken, is identified. This can be done in a umber of ways. For example, a further instruction can be located in the string of instructions being executed prior to the branch point in which case said further instruction will identify the branch point which will be held in a branch point register. The contents of the branch point register can ten be compared with an instruction pointer register holding an indication of the address from which a next instruction would normally be fetched and when the two are equal the effect branch signal is generated. Alternative methods for identifying the branch point are also discussed herein.

The provision of a further instruction which identifies the branch point but which is located before the branch point reduces the number of unwanted instructions which will be fetched before the branch is taken.

As a still further alternative, the set branch instruction itself can identify the branch point which is stored in the branch point register, thereby obviating the need for a further instruction.

However, in a particularly preferred embodiment, the branch point is identified by a further, dedicated instruction, different to the set branch instruction, which is located at the branch point in the string of instructions being executed. To allow for additional branches to be effected, this effect branch instruction can itself define the condition to be satisfied so that a branch is only taken if the condition is satisfied and is not taken if the condition not satisfied.

This provides a further technical advantage over the system of EP-A-355069 discussed above. In that system, the set branch instruction itself must indicate whether or not the branch is conditional or not and cause various different condition detectors to be in a ready state, ready to sense a condition. The condition itself is defined in an instruction different to the set branch instruction and to the split bit instruction.

To avoid the need for state indicators, the present invention provides in another aspect a computer system for fetching, decoding and executing instructions comprising storage circuitry for holding a plurality of instructions at respective storage locations, said plurality of instructions being arranged in instruction strings, each string comprising a first instruction and a set of subsequent instructions, and instruction fetch circuitry for fetching a sequence of instructions from said storage circuitry and including an indicator for providing an indication of a next address at which a next fetch operation is to be effected. The computer system further comprises execution circuitry for executing fetched instructions, wherein at least one of said instruction strings includes a set branch instruction (SET) which provides an indication of a target location from which a subsequent instruction may be fetched, the subsequent instruction being from a different instruction string, and an effect branch instruction different from said set branch instruction and located at the branch point after which said new instructions are to be executed and wherein said instruction fetch circuitry is operated responsive to execution of a said set branch instruction (SET) to fetch in parallel subsequent instructions from said string containing said set branch instruction and new instructions from said different instruction string commencing from said target location while said subsequent instructions continue to be executed and select circuitry responsive to execution of a said effect branch (DO) instruction to cause said execution circuitry to execute said new instructions if a condition determined by the effect branch instruction is satisfied.

The invention also provides in a further aspect a method of operating a computer to fetch decode and execute instructions which computer has storage circuitry holding a plurality of instructions at respective storage locations, said plurality of instructions being arranged in instruction strings, each string comprising a first instruction and a set of subsequent instructions. The method comprises fetching a sequence of instructions from said storage circuitry and providing an indication of a next address at which a next fetch operation is to be effected, decoding said instructions, and executing each instruction in turn, wherein at least one of said instruction strings includes a set branch instruction (SET) which provides an indication of a target location from which a subsequent instruction may be fetched, the subsequent instruction being from a different instruction string. The method further comprises on execution of said set branch instruction, fetching in parallel subsequent instructions from the string containing said branch instruction and new instructions from said different instruction string commencing from said target location, continuing to execute said subsequent instructions until an effect branch instruction is executed which is located at the branch point after which new instructions are to be executed and which indicates that further instructions to be executed are said new instructions if a condition determined by the effect branch instruction is satisfied, and responding to said effect branch signal by commencing execution of said new instructions.

As an alternative arrangement to enable the computer system to perform conditional branches, it can include circuitry for holding a state indicator in one of a confirmed state and a rejected state. The confirmed state is one in which further instructions to be executed are new instructions commencing from target location. The rejected state is one in which further instructions to be executed are subsequent instructions in memory and not new instructions. One of the states can be set responsive to execution of the set branch instruction and the other of the states can be selectively set responsive to execution of a second instruction different from the set branch instruction and subject to a condition.

The second instruction can be a confirm instruction which sets the confirmed state if the confirm condition is satisfied.

Alternatively, the second instruction could be a reject instruction which sets the rejected state if the reject condition is satisfied.

The provision of these reject or confirm instructions allows a further improvement to be made in that the set branch instruction is the first instruction of the string and there is a plurality of contiguous instruction strings, with the set branch instruction acting as a further instruction to generate the effect branch signal if the state indicator is in the confirmed state. It will be appreciated that the set branch instruction acting as the further instruction will also change the state of the state indicator back to its original state. Preferably the confirm/reject instruction can be placed as early as possible within the string (after the condition has been generated) so that the execution circuitry can be given an early indication of which way the branch will go.

BRIEF DESCRIPTION OF THE DRAWINGS

For a better understanding of the present invention and to show how the same may be carried into effect, reference will now be made by way of example to the accompanying drawings.

DESCRIPTION OF THE PREFERRED EMBODIMENTS

Figure 1:
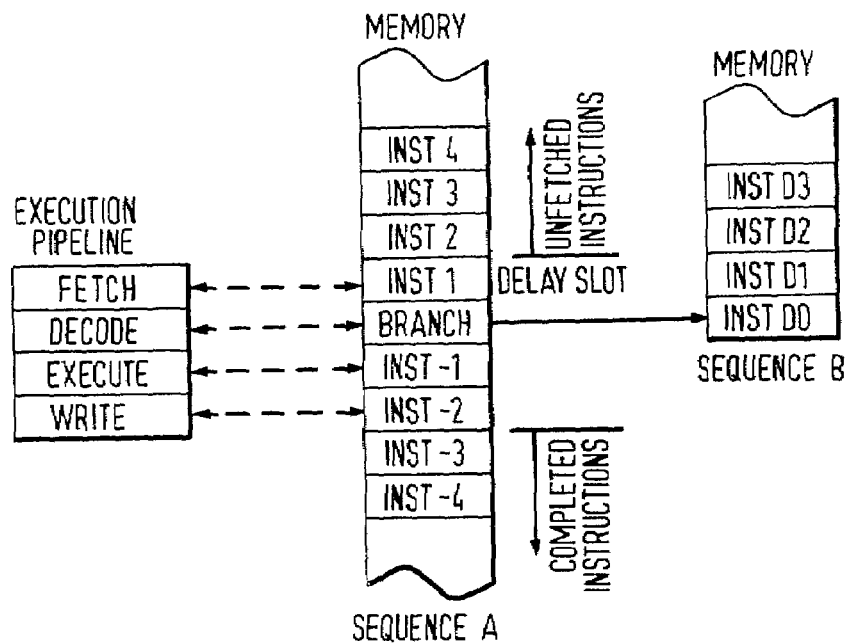
FIG. 1 is a schematic illustrating a known branching system.
Figure 2:
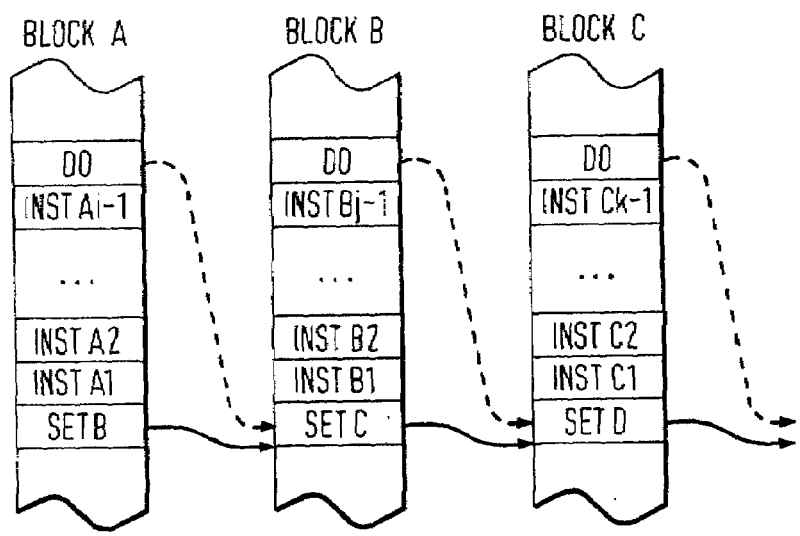
FIG. 2 is a schematic illustrating the branch system of the present invention for non-conditional branches.
Figure 3:
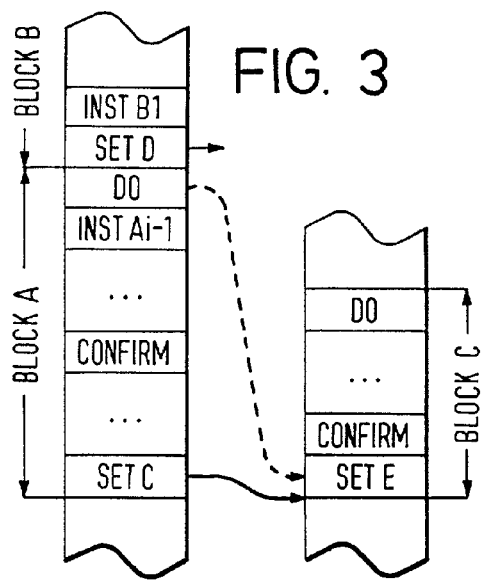
FIG. 3 is a schematic illustrating the branch system of the present invention for conditional branches.

Reference will first be made to FIGS. 2 and 3 to explain the concept underlying the branching system of the present invention. FIG. 2 illustrates three blocks of instructions in memory, Block A, Block B and Block C. Each block comprises a first instruction which in each case is a set branch instruction Set B, Set C, Set D, respectively, a sequence of subsequent instructions for example Inst A1, Inst A2 . . . Inst Ai-1 in Block A and a last instruction which in each case is an effect branch instruction referred to herein as D0. Assume that the sequence of instructions in Block A is being fetched decoded and executed in a pipelined computer system. On execution of the first instruction Set B, a target location for a branch is stored, in this case identifying the memory address of the first instruction Set C of Block B. However, no action is taken at this stage other than to store the target location and possibly to set up the memory containing Block B for an access, for example by moving the relevant memory addresses to a local cache. The instructions in Block A continue to be fetched, decoded and executed until the last instruction, D0, is being executed. Execution of this instruction causes an effect branch signal to be generated which causes the execution unit to address as its next instruction the target location set up by the set instruction Set B. Thus, the next instruction to be fetched from memory is the first instruction Set C of Block B. This is indicated by the dotted arrow in FIG. 2.

FIG. 2 illustrates the case for unconditional branches, that is branches that will inevitably be taken. FIG. 3 illustrates the position for conditional branches, that is branches that may or may not be taken depending on whether or not a condition which has been evaluated is satisfied. FIG. 3 illustrates the case where a third instruction is used in addition to the set branch instruction and effect branch instruction described above with reference to FIG. 2. In FIG. 3 this third instruction is referred to as CONFIRM, although it will become clearer in the following that it is possible to implement conditional branches using a reject instruction with the opposite semantics.

It is also possible to implement conditional branches using a conditional DO instruction.

FIG. 3 illustrates three sequences of instructions held in memory as Block A, Block B and Block C. Block B is shown contiguous to Block A and is arranged in memory such that if instructions are fetched from memory using sequential memory addresses then instructions will be normally fetched in the sequence of Block A followed by Block B. Block C is shown located elsewhere in memory. As in FIG. 2, each block comprises a first instruction which is a set branch instruction (Set C in Block A, Set B in Block B and Set E in Block C). Block A then additionally comprises a sequence of instructions to be executed including a confirm instruction and the last instruction which is the effect branch instruction. As described above with reference to FIG. 2, instructions are fetched, decoded and executed. When the first instruction of Block A is executed it is identifed as a set branch instruction with a target location identifying the memory address of the first instruction Set E in Block C. Instructions in Block A continue to be fetched, decoded and executed until the confirm instruction is reached which has a condition associated with it. If the condition is satisfied, the branch is confirmed and execution of the effect branch instruction DO at the end of Block A will cause the branch identified by the target location to be taken as indicated by the dotted line in FIG. 3. Thus, the next instruction to be fetched, decoded and executed will be the first instruction Set E of Block C. If the confirm condition is not satisfied, the branch will not be taken when the effect branch instruction is executed but instead the next instruction to be fetched, decoded and executed will be the first instruction Set D of Block B which sequentially follows Block A in memory. It will readily be appreciated that once confirm instructions has been introduced, it will be necessary even to confirm unconditional branches such as that which is illustrated by way of example in Block C, where the branch is always confirmed and is not subject to a condition.

It is assumed for the purposes of the present description that any useful computer system must be capable of implementing conditional branches in addition to unconditional branches. It will be appreciated that in order to implement branches as described above with reference to FIGS. 2 and 3, a target register must be provided for storing the target location indicated by the set branch instruction. Moreover, for conditional branches a state indicator must be provided to indicate whether the branch is in a confirmed state or not. A detailed explanation of circuitry capable of implementing the present invention is given later. Firstly, there follows an explanation of the various different ways in which branch instructions in accordance with the present invention may be implemented.

| METHOD A | | |
|---|---|---|
| set | <addr> | ;specify branch target |
| . . . | | |
| confirm | <cond> | ;confirm the branch |
| . . . | | |
| do | | ;execute it, if confirmed |

This is the scheme outlined above. There are three distinct instructions. One bit of state is needed to specify whether the branch has been confirmed or not. There could be multiple confirm instructions, the branch being taken if the condition evaluated for any confirm instruction is true.

| METHOD B | | |
|---|---|---|
| set | <addr> | ;specify branch target |
| . . . | | |
| reject | <cond> | ;optional conditional reject branch |
| . . . | | |
| do | | ;do the branch if not rejected |

This mechanism is similar to Method A, except that the branch has to be rejected, rather than confirmed. As before, one bit of state is required to hold whether the branch has been rejected or not. The set instruction initializes the branch target register, and sets the state to branch. The reject instruction conditionally sets the state to not branch. The do instruction executes the initialized branch, if the state is still at branch. With these semantics, the reject instruction is optional, unconditional branches would not need one. There can be more than one reject instruction, if any nullify the branch, then the branch will not be taken.

| METHOD C | | |
|---|---|---|
| set | <addr> | ;initialize branch target |
| . . . | | |
| do | <cond> | ;conditionally execute branch |

This method combines the confirm and do instructions, so that do becomes a conditional do. There is no requirement for a state machine to hold whether the branch is to be taken or not.

| METHOD D | | |
|---|---|---|
| set | <addr> | ;initialize branch target |
| ... | | |
| confirm | <cond> | ;conditionally confirm branch |
| ... | | |
| do | <offset> | ;perform branch some instruction later |

This scheme delays the effect of the do instruction by a variable amount (<offset>). This permits unnecessary instruction fetching to be stopped at the end of the block of instructions.

The end of the block (branch point) is indicated in the do instruction, either as an offset to the last instruction in the block, the first instruction in the subsequent block or as an instruction count to the end of the block. Two registers are required, one bit of state to record whether the branch has been confirmed or not, and a branch point register to hold the block termination address or count, as an indication of the branch point.

| METHOD E | | |
|---|---|---|
| set | <addr> | ;initialize branch target |
| ... | | |
| reject | <cond> | ;optionally conditionally reject branch |
| ... | | |
| do | <offset> | ;perform branch some instruction later |

This scheme is similar to Method D, except that the branch is conditionally rejected, rather than confirmed. The reject instruction is optional.

| METHOD F | | |
|---|---|---|
| set | <offset>,<addr> | ;initialize target and branch point |
| ... | | |
| confirm | <cond> | ;conditionally confirm branch |

This scheme is similar to Method D, except that the branch point is specified with the set instruction, thus removing the requirement for a do instruction. The branch still needs to be confirmed, otherwise it will be ignored. Two additional registers are required, one bit of state to record whether the branch has been confirmed or not, and a branch point register to hold the block termination offset or count as an indication of the branch point.

| METHOD G | | |
|---|---|---|
| set | <offset>,<addr> | ;initialise target and branch point |
| ... | | |
| confirm | <cond> | ;optionally conditionally reject branch |

This scheme is similar to Method F, except that the branch can optionally be rejected. Unconditional branches do not require a reject instruction. The same additional state is required.

| METHOD H | | |
|---|---|---|
| set | <addr> | ;initialize branch target |
| ... | | |
| do | <cond>,<offset> | ;confirm and set branch point |

This method is a combination of Method C and Method D. The set instruction specifies the branch target location, whilst the do instruction specifies both a branch point and the condition on whether the branch is to be executed. Two pieces of state are required to support this, a branch point register to hold the branch point and one to hold whether the branch is to be executed or not. Both of these are set by the do instruction. If the condition is false, the processor stays in the unbranching state. Unconditional branches could either specify a true condition, or use a special unconditional do instruction.

This method is interesting, as it does not require the branch target location to be set for each block, if the target of successive blocks is the same. This occurs in tight loops. For instance the following code is valid.

| set | loop | ;set branch target to loop |
|---|---|---|
| loop: | | ;loop entry point |
| ... | | ;loop code |
| do | <cond>,<offset> | ;loop continuation condition |
| ... | | ;some more loop code |

The set instruction is executed only once. The same branch target is required for each iteration of the loop.

Some of the above referenced methods can be modified still further. For example, it will be clear that for a plurality of contiguous blocks in memory as illustrated for example in FIG. 3 where the set branch instruction is the first instruction of a block and the do instruction is the last instruction of a block, there will be at each block interface a do instruction immediately followed by a set instruction. This is illustrated particularly where Block A meets Block B in FIG. 3. For methods which hold an indication as to whether or not the system is in a branch state, it is possible to eliminate the do instruction at the end of a block and to rely on the set instruction at the beginning of a contiguous block. Thus, Methods A and B can be modified to eliminate a different do instruction and to interpret the set instruction as follows. If the system is in a branch state, the subsequent set instruction at the beginning of the next block is executed as though it were a do instruction to effect the branch. If the system is not in a branch state when the set instruction at the beginning of the next block is executed, the branch will not be taken and the set instruction will be executed in the normal manner to set up a branch with a target location.

Figure 4:
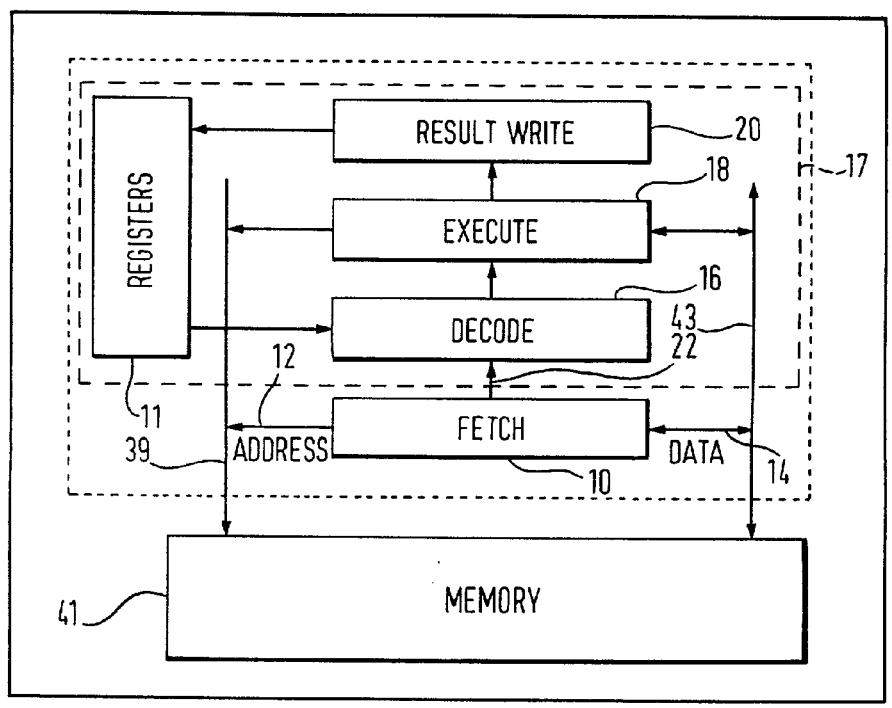
FIG. 4 is a simple block diagram of a pipelined processor.

There will now be described a computer system for implementing branching using a split branch instruction. FIG. 4 is a simplified block diagram of a pipelined computer system. This shows a memory 41 which in this example comprises a conventional RAM. The computer system includes an address bus 39 and a data bus 43 coupled to the memory 41. It will be appreciated that read and write control signals for the memory are required but they are not illustrated in FIG. 4. The memory 41 holds program comprising sequences of instructions at different addressable locations, as already described above with reference to FIGS. 2 and 3. The memory 41 may also hold data. The data bus 43 carries data values to and from the memory 41. The address bus 39 carries memory address values for read or write operations. The computer system comprises an instruction fetch circuit 10 which is arranged to supply addresses to memory along address line 12 and to receive instructions from memory along data line 14. A decode circuit 16 is connected to receive instructions fetched by the fetch circuit and supplied on instruction line 22 and decodes them. The decode circuit 16 supplies instructions to an execution circuit 18 which executes instructions and controls a result write circuit 20 to write results of the execution into temporary registers 11. For the purposes of the present invention, the decode circuit 16, execution circuit 18, result write circuit 20 and registers 11 are conventional and are not described further herein. They are referred to together in the following as the processor 17.

The fetch circuit 10 is arranged to fetch four bytes at a time from the memory 41 and to provide instructions along instruction line 22 to the decode circuit 16. Where the instructions are of variable length. it will be appreciated that an alignment mechanism is required within the instruction fetch circuit to deal with instructions which are not exactly four bytes long and to correctly align these instructions. Circuitry to accomplish this is described in copending European Patent Application Number 95303608.4, filed May 26, 1995 entitled "COMPUTER INSTRUCTION COMPRESSIOW". The present invention can be implemented with same length or variable length instruction sets.

The fetch circuit 10 comprises two instruction fetchers, one of which will now be described with reference to FIG. 5. The data line 14a and address line 12a are connected to the corresponding lines 14 and 12 illustrated in FIG. 4. The fetcher includes a fetch pointer 65 which comprises a 32 bit latch containing the next address in memory from which a 32 bit word is to be read. Whenever a value is read from memory, the fetch pointer 65 is normally increased by four bytes to a new pointer address via an increment unit 38. The fetcher is arranged to read instructions from memory on data line 14 into an instruction buffer 66 from which they are output along instruction line 22 to the processor 17. For variable length instructions, a length indicator 74 is provided which receives on line 70 an indication from the instruction buffer 66 of the length of the instruction which has been output. The length indicator 74 generates an amount signal 86 which indicates the number of bytes used by the instruction being output. A byte counter 75 holds a count of the number of bytes in the instruction buffer 66 at any one time and generates a select signal 24 which determines where in the instruction buffer 66 bytes fetched from the memory 41 are to be inserted. The instruction buffer 66 also receives a remove signal 26 which causes an instruction to be removed from the buffer. Unremoved instructions are shifted along, thereby creating space at the end of the buffer for more bytes from the memory 41. The instruction buffer 66 is also responsive to a store signal 28 which causes bytes from the memory to be stored in the buffer at the location indicated by the select signal 24. The store signal 28 is derived from a latch signal 30 which is used to indicate that data can be stored from the memory.

The fetch pointer 65 is supplied with an address on line 32 from a fetch multiplexor 34 which has one input connected to receive a next address on line 36 from the increment unit 38. The increment unit 38 updates the fetch address in the usual manner, in this example by four bytes each time. The other input of the fetch multiplexor 34 is connected to a start line 40 on which is supplied a new address from which fetching is to be commenced. It will readily be appreciated that for the purposes of branching the new address is derived from the target location identified in the set branch instruction. A begin signal 42 controls the fetch multiplexor 34 to start fetching from a new address on the start line 40. The fetch pointer 65 has its latch input connected to an OR gate 44 which receives the begin signal 42 and the latch signal 30 to control latching of subsequent addresses into the fetch pointer 65. The latch signal 30 is also supplied to a gate 46 which is connected to the latch input of the byte counter 75 and which receives as its other input a next signal 48 which is used to indicate that an instruction has been read from the instruction buffer 66 and which thus latches the appropriate byte count.

The begin signal 42 is also fed to the clear input of the byte counter 75 and to the clear input of a stop latch 50. The stop latch 50 receives on the Stop At line 52 the address after which no further instructions are to be fetched. This address is stored in the stop latch 50 under the control of a stop signal 54. The output of the stop latch 50 is fed to a comparator 56 which also receives the memory address on line 12. The comparator 56 determines whether or not the memory address on line 12 has reached the address stored at the stop latch 50. The output of the comparator 56 is supplied to a gate 58 which also receives the output from a check full unit 80. The check full unit 80 receives the output from the byte counter 75 and asserts its output whenever the buffer 66 is full. The output of the gate 58 provides a full signal on line 82 which indicates either that the instruction buffer 66 is full or that the stop address has been reached. No further memory requests will be performed when the full signal 82 is asserted. The output of the byte counter 75 is also fed to a second increment unit 84 the output of which is fed to one input of a count multiplexor 85. The other input of the count multiplexor 85 is supplied from a subtract unit 90 which receives the output from the byte counter 75 and the output from the length indicator 74. The subtract unit 90 asserts a more signal 92 whenever the instruction buffer does not contain at least one instruction.

Operation of the instruction fetcher will now be described. A start address, which is the memory address identifying the first four bytes at the beginning of a block of instructions is supplied on line 40 to the fetch multiplexor 34. The begin signal 42 is asserted to clear the stop latch 50 and to latch the start address into the fetch pointer 65. A memory access is made at that address and the first four bytes are supplied along data line 14 to the instruction buffer 66. The latch signal 30 causes these four bytes to be stored in the buffer and latches a next address into the fetch pointer 65. This next address will now be the start address incremented by four bytes by the increment unit 38, unless a branch is being taken as described more fully later. The instruction buffer 66 supplies an instruction along line 22 and indicates the length of the instruction on line 70 to the length indicator 74. The output of the length indicator 74 supplies the amount signal 86 to indicate the size of the instruction which has been removed and also supplies an input to the subtract unit 90 which provides a count to the byte counter 75 to enable it to assert the select signal 24 to determine where in the buffer the next four bytes fetched from memory should be stored.

As has already been described, removal of an instruction from the buffer on line 22 is under the control of the next signal 48. If there is not at least one instruction held in the instruction buffer, the more signal 92 is asserted. If the instruction buffer is full, the check full unit 80 causes the full signal 82 to be asserted to prevent further memory accesses.

The stop latch 50 is used to store an address which the fetcher should not advance past. On commencement of fetching at the start address the stop latch 50 is cleared to an invalid address by the begin signal 42. Storing a special address in the stop latch 50 will stop fetching. The use of the stop latch 50 will become clearer in the following description of the application of the fetcher unit.

When a branch instruction has been fetched, decoded and executed, the target location identified by the branch instruction is used to provide the start address on line 40 for the instruction fetcher when the effect branch signal has been supplied to cause a branch to be taken. The fetcher thus commences fetching of instructions from the new target location.

The fetch circuit 10 of FIG. 4 includes two instruction fetchers of the type described above with reference to FIG. 5. Reference will now be made to FIG. 6 to describe in more detail how branch instructions control the activity of the instruction fetchers. In FIG. 6, the fetchers are illustrated as Fetcher A and Fetcher B. The system includes an arbitrator unit 100 which arbitrates between Fetcher A and Fetcher B for access to the memory using the full and more signals from each fetcher to determine which requires data. The full and more signals for Fetcher A are referred to at the arbitrator as more A and full A and the full and more signals for Fetcher B are referred to at the arbitrator as more B and full B. Reference numerals relating to Fetcher A correspond to those for the instruction fetcher shown in FIG. 5. These numerals are not repeated again for Fetcher B, because this has precisely the same signals and operation as fetcher A. The address outputs 12*a* of the Fetchers A and B are supplied through an address multiplexor 102 to the address line 12. The multiplexor is controlled by a Sel A signal on line 104 from the arbitrator 100 which gives priority to the fetcher which is currently fetching instructions for execution. It will be appreciated that one of the fetchers is used to fetch instructions in the current block (and potentially the next sequential block) and the other fetcher is used to fetch instructions commencing from the target location. Both fetchers receive instructions along data line 14 and supply their instructions on line 22*a* to a select multiplexor 104. The output 22 of the multiplexor 104 is connected to the processor 17 which decodes and executes instructions and writes the results to temporary registers 11. The processor 17 supplies the next signal which is fed to the instruction fetchers on line 48. The processor 17 receives a wait signal on line 106 which is derived from the more signals 92 of the fetchers. As the processor 17 executes instructions it updates an instruction pointer register 108 to point to the next instruction to be executed by supplying an output on the new IP line 110 via a pointer multiplexor 112. A latch IP signal on line 114 indicates when the instruction pointer register 108 is to be updated. The output of the instruction pointer register 108 provides the current value of the instruction pointer on a current IP line 116.

The computer system of FIG. 6 also includes a target pointer register 118 for holding a target location identified by a set branch instruction and a branch pointer register 120 for holding a value identifying the point at which the branch is to be taken. The computer system also includes an active fetcher switch 122 which controls which of the fetchers A and B is supplying instructions to the processor 17. There is also a compare unit 124 connected to receive the outputs from the branch pointer register 120 and the instruction pointer register 108. A check output from the processor 17 on line 126 is fed via a gate 128 to control the pointer multiplexor 112 and the active fetcher switch 122. The gate 128 also has an input on line 130 from the compare unit 124.

The execution circuit of the processor 17 includes a set branch instruction execution unit 136 and a do instruction execution unit 142. The computer system also includes a state indicator 132 for holding an indication of the state of the system, that is whether it is in a branch state or not.

The remaining gates illustrated in FIG. 6 are not described herein because they are illustrated for the sake of completeness only to more clearly demonstrate the connections between the signal lines.

Operation of the computer system of FIG. 6 will now be described. Assume that the processor 17 is to execute block A of FIG. 3. The start address identifying the beginning of the first instruction of block A is supplied to fetcher A. The first instruction is supplied on line 22*a* to the multiplexor 104 which is controlled by a signal on line 134 from the active fetcher switch 122 so that instructions from fetcher A are supplied to processor 17. The first instruction is a set branch instruction Set C which is identified by the set branch execution unit 136 forming part of the processor 17. The set branch execution unit 136 generates the appropriate target location on target line 138 and a set signal on line 140. The set signal is used to activate the begin signal 42 for fetcher B so that that fetcher is initialised to commence starting to fetch instructions from the target location. The target location is also stored in the target pointer register 118. Instructions in block A continue to be supplied by fetcher A from memory to the processor 17 and executed. On execution of the confirm instruction, the condition for the confirm instruction is evaluated and the state indicator 132 is appropriately set. The condition line 145 indicates the state of the system which is selectively supplied to the stop lines 54 and the fetchers as described later. The following description assumes that the condition for the confirm state has been positive so that the system is in a branch state. After fetching decoding and execution of further instructions up to and including Inst A-1 in block A, the next instruction is an effect branch instruction. This is executed by the do instruction execution unit 142 which forms part of the processor 17. On execution of the effect branch instruction by this unit 142, the branch point is calculated (the first address of the first instruction at the beginning of the next sequential block) and is supplied to the branch pointer register 120 along line 144. The branch point is also supplied to the stop latches 50 of the fetchers. In this case, the stop signal 54 is asserted for Fetcher A via the condition line 145 and not for Fetcher B. Therefore Fetcher A latches the stop address so that it will stop fetching when that address is reached. When the branch point stored in the branch pointer register 120 matches the address of the next instruction stored in the instruction pointer register 108, the output of the compare unit 124 causes an effect branch signal to be asserted on line, 146. This controls the instruction pointer multiplexor 112 to update the instruction pointer register 108 from the target pointer register 118 which, it will be recalled, holds the target location identified in the set branch instruction. Furthermore, the effect branch signal 146 is supplied to the active fetcher switch 112 which causes fetcher B to become the active fetcher commencing fetching from the target location so that the branch is taken. The output of the active fetcher switch 112 controls the instruction multiplexor 104 to switch its inputs.

If the condition which was evaluated for the confirm instruction indicates that the branch is not to be taken, on execution of the do instruction by the do branch execution unit 142, an invalid address is supplied on branch line 144 to be stored in the stop latch 50 of the active fetcher, Fetcher A. Thus, the active fetcher will continue to fetch sequential instructions from memory so that the branch will not be taken. Likewise, the invalid address stored as the branch point in the branch pointer register 120 will never match the address stored in the instruction pointer register 108 so that compare unit will never cause the effect branch signal 146 to be asserted.

The desription given above relating to the computer system of FIG. 6 is for a system including a branch point register and a state indicator for holding the state of the system. As mentioned earlier, these may be omitted if a method such as method C is utilised in which the effect branch signal is a conditional signal located at the branch point. The set branch instruction sets the target location into the target pointer register 118 as described above. When the effect branch instruction is executed, the condition defined in the instruction is evaluated. If that condition is true, the effect branch signal 146 is supplied to cause fetcher B to become the active fetcher commencing fetching from the target location so that the branch is taken. The target location remains valid in the target pointer register 118 and, instead of fetcher A being controlled to stop fetching as described above, it is caused to commence fetching new instructions from the target location. This has the advantage that if a further branch should be required having a target location defined by the set instruction, the new instructions have already been fetched.

When an effect branch instruction has been executed for which the condition defined in the instruction is true, all instructions which entered the execution unit 142 after the effect branch instruction are deleted because they should not be executed. Instead, execution of the new instructions is commenced.

Thus, on execution of an effect branch instruction for which the condition is satisfied, fetcher A and fetcher B swop over their roles.

If an effect branch instruction is executed for which the condition determines that the branch is not to be taken, there is no change to the role of the fetchers.

The target location remains valid and stored in the target pointer register 118 until execution of the next set instruction, which resets a new target location in the target pointer register 118.

Figure 11:
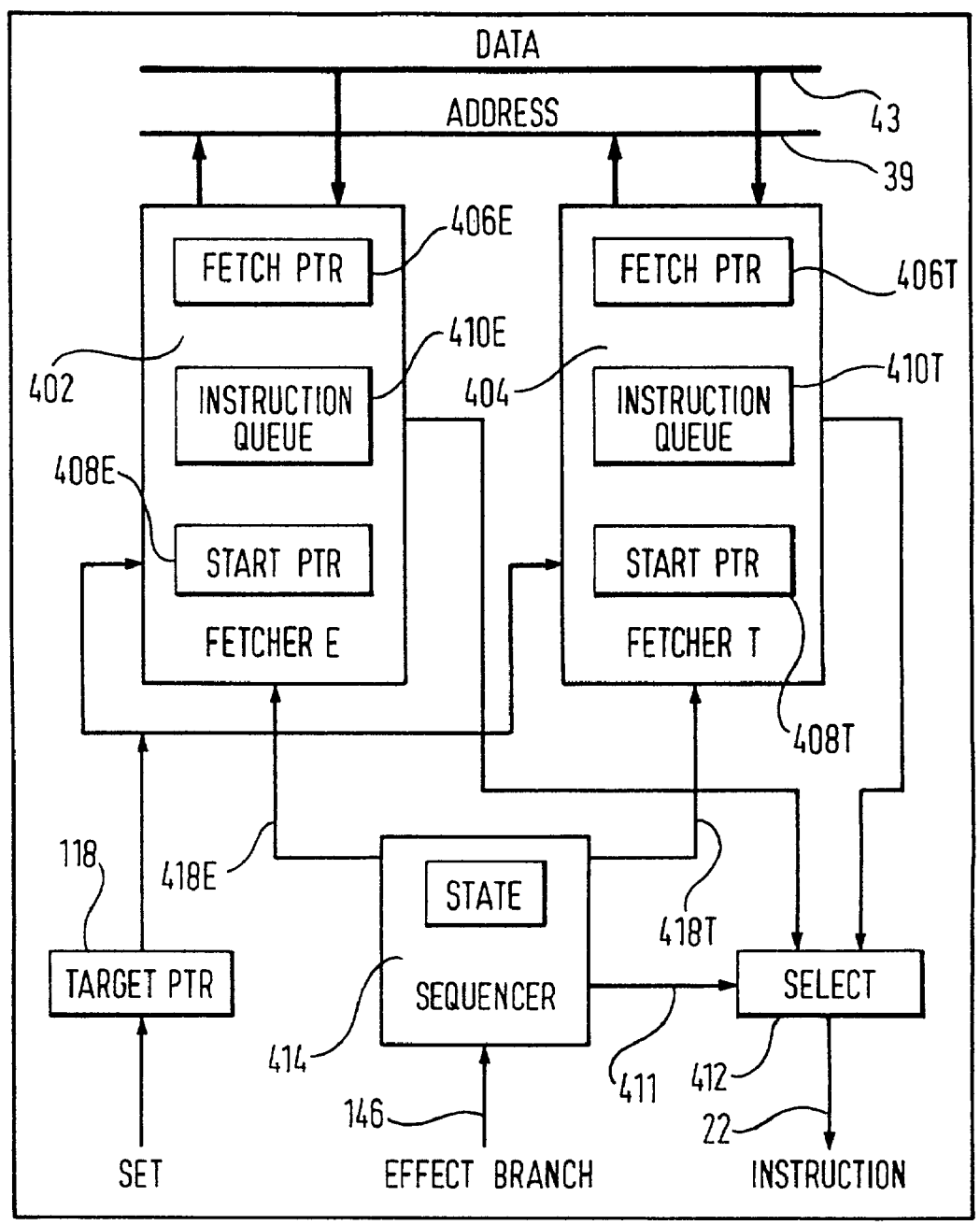
FIG. 11 is a block diagram illustrating a non predictive fetcher.

FIG. 11 is a block diagram illustrating this principal. In FIG. 11, reference numerals 39 and 43 denote the address bus and data bus as in preceding figures. The fetch circuitry 10 in FIG. 4 is implemented by an execute instruction fetcher 402 and a target instruction fetcher 404. These are denoted fetcher E and fetcher T respectively. Like elements in each fetcher have the same reference numeral, suffixed E or T appropriately. Each fetcher comprises a fetch pointer 406 for holding an indication of the next address from which instructions are to be fetched and a start pointer 408 for holding the target location representing the first instruction in a new string of instructions. Each fetcher also has a buffer 410 for holding a queue of instructions.

Reference numeral 118 denotes as before the target pointer register which holds an indication of the target location responsive to execution of the set branch instruction. Reference numeral 412 denotes a select circuit for selecting the one of the fetchers acting as the execute Fetcher E to supply its instructions to the decode circuit 16 of FIG. 4. A sequencer 414 receives the effect branch signal 146 and has state which changes on receipt of that signal to cause the role of the fetchers to alter as described above, by controlling the select circuit 412 along line 411.

The sequence 414 can also provide signals to the fetchers 408E,T along lines 418E,418T respectively. When the effect branch signal occurs, the sequencer supplies a signal on line 418E to cause Fetcher E to commence obtaining instructions from the target location.

Sometimes it is useful to provide more than two instruction fetchers to take into account conditional instructions which probably will be satisfied and conditional instructions which probably will not be satisfied. This is particularly the case where the execution unit is pipelined and the determination of the effect branch condition is made at a late stage in the pipeline.

Figure 12:
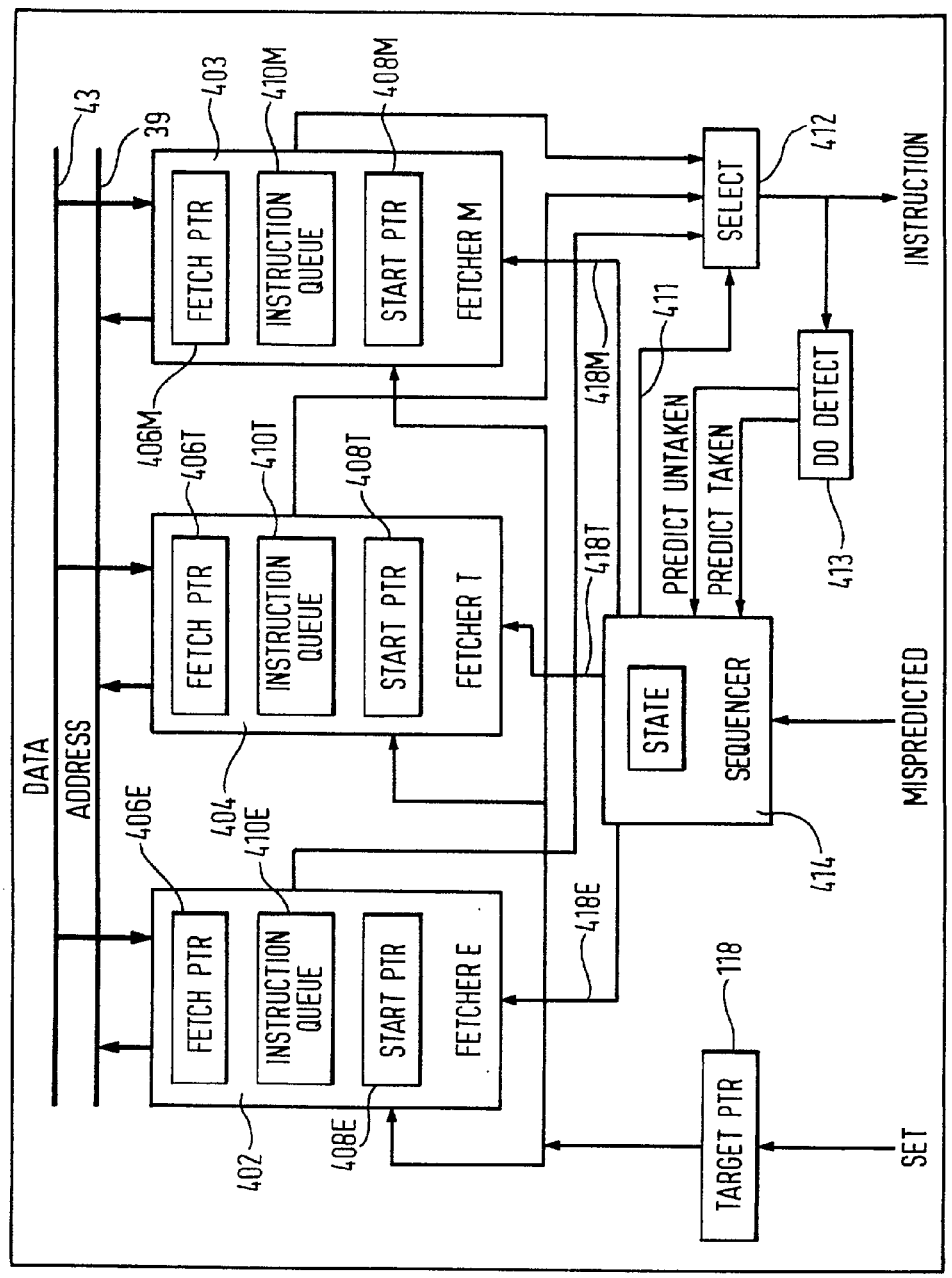
FIG. 12 is a block diagram illustrating a predictive fetcher.

FIG. 12 is a block diagram illustrating a system for implementing such an arrangement. In FIG. 12, like numerals denote like parts as in FIG. 11 for the execute instruction fetcher and the target instruction fetcher and the other features common between FIGS. 11 and 12.

The system of FIG. 12 additionally includes a mispredict fetcher 403, fetcher M. This likewise has a fetch pointer register 406M for holding the address from which next instructions are to be fetched, a buffer 410M for holding a queue of instructions and a start pointer register 408M for holding the start address from which instructions are to be fetched. The select circuit 412 is arranged to select the one of the three fetchers acting as the execute fetcher E to supply instructions to the decode circuitry 16.

As before, the execute fetcher 402 fetches the normal sequence of instructions for supply to the execution unit. The target fetcher 404 fetches instructions beginning from the target location, and thus holds the next branch target instruction. In addition to these two fetchers, the mispredict fetcher 403 fetches instructions which are located at a branch resulting from a conditional instruction which probably will not be satisfied. This is referred to as a predicted to be not used arm of a branch. If it is subsequently determined that a conditional branch was predicted the wrong way, the correct sequence of instructions is held in this fetcher.

On execution of a set branch instruction, an indication of the target location is loaded into the target pointer register 118 as before. The target fetcher 404 is cleared and starts fetching instructions from the target location.

When a conditional DO instruction which will probably be taken (or an unconditional DO instruction) is sent to the execution unit, the functions of the three fetchers is changed so that the execute fetcher 402 becomes the mispredict fetcher, the target fetcher 404 becomes the execute fetcher and the mispredict fetcher 403 becomes the target fetcher. The new target fetcher (formally the mispredict fetcher fetcher M) is cleared and starts fetching instructions from the target location stored in the target pointer register 118. When a conditional DO instruction representing a condition which probably will not be met is sent to the execution unit, the roles of the target and mispredict fetchers alter as follows. The target fetcher fetcher T becomes the mispredict fetcher and the mispredict fetcher fetcher M becomes the target fetcher. The new target fetcher is cleared and starts fetching instructions at the target location stored in the target pointer register 118.

Detection of despatch of these conditional DO instruction to the execution unit is undertaken by a detect unit 413. This supplies Predict Taken and Predict Untaken signals to the sequencer 414.

When a DO instruction is executed by the execution unit, it is determined whether or not the branch is to be taken. If this agrees with the prediction, then all is well. If however the taking of the branch was incorrectly predicted, all instructions which entered the execute unit after the incorrectly predicted conditional DO instruction are deleted, and the mispredict fetcher and execute fetcher swap roles. To this end the sequencer receives a Mispredicted signal from the execution unit.

This arrangement can be implemented in a variety of different ways without affecting the concept. For example, when the fetchers are renamed the contents of the outgoing target fetcher could be copied to the incoming target fetcher. This means that the new target fetcher does not waste time refetching these instructions. It would continue the fetching from where the outgoing target fetcher left off, provided it is not full. Alternatively, the fetchers need not be renamed dynamically, but their contents transferred as appropriate. This would remove any requirement for state in the sequencer 414.

The instruction fetcher and circuitry described above are capable of implementing so-called simple branches. Other, specialised type of branch instructions are also useful. One of these is kernel branches. Many processors have two modes of operation, one for normal programs and one for special programs. These are referred to as user and kernel modes. Kernal mode has more instructions available to it which are used to manipulate the operation of the computer. This separation is required to prevent an erroneous or malicious user mode program from causing damage to other user mode programs. Kernel mode programs can be assumed to be correct. There is therefore a need for a method to change a programs mode from user to kernel. This is done by branching to a special target location, called the kernel entry point. With the present invention this is implemented using a special set branch instruction, which does not specify the branch target location explicitly but uses an implicit value. Some state must be used to specify that when the branch occurs, the processor must change to kernel mode.

Another specialised kind of branch instruction is a so-called descriptor branch, which is a call via a pointer. This branch instruction specifies an address in memory, but it is not the address representing the target location of the branch. Instead, it is a memory location containing the target location for the branch.

Figure 7:
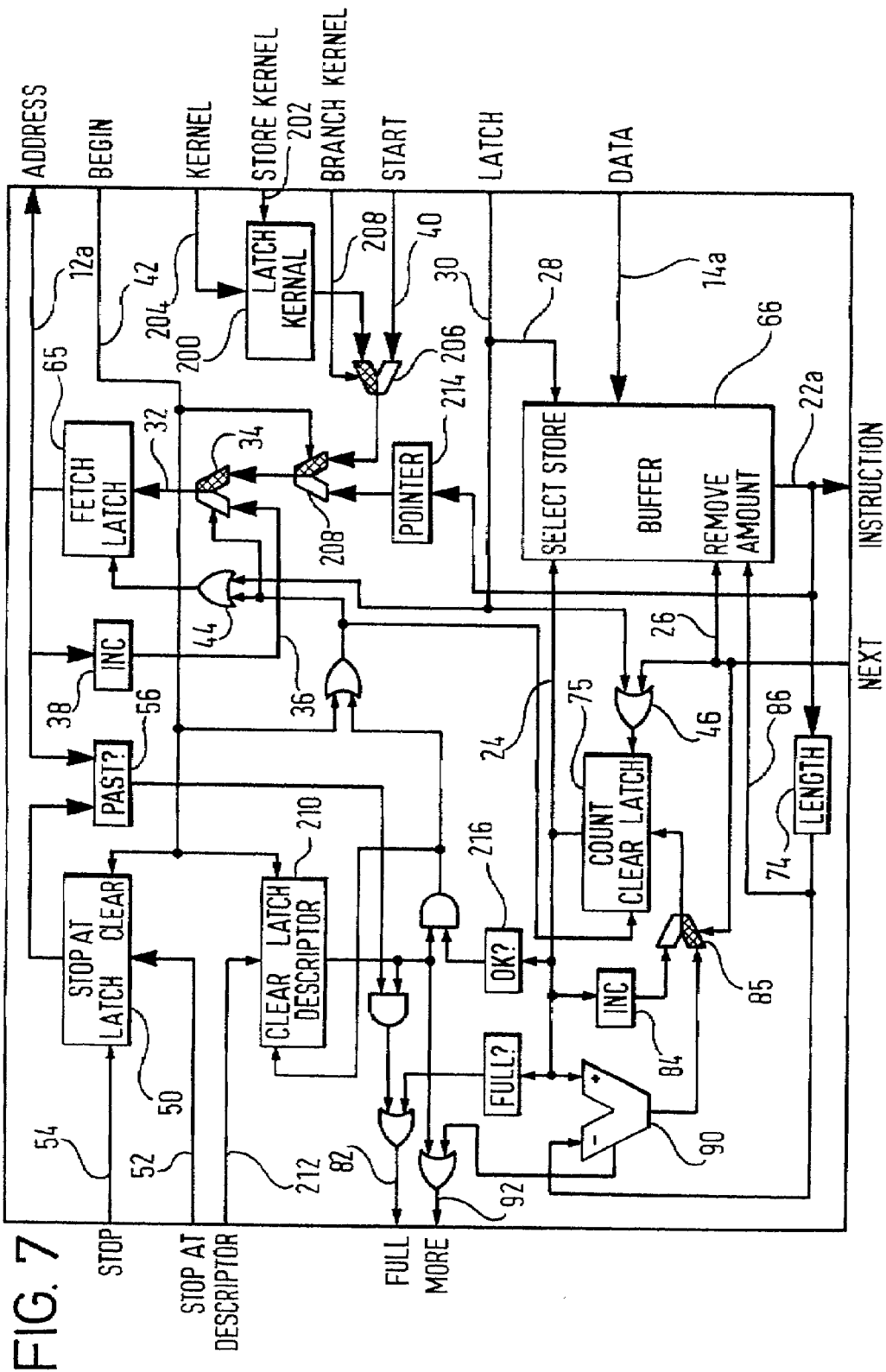
FIG. 7 is a circuit diagram of an instruction fetcher with kernel and descriptor functions.

FIG. 7 illustrates an instruction fetcher which can be used to implement kernel and descriptor branches. Like numerals in FIG. 7 denote like parts in FIG. 5. The fetcher of FIG. 7 has the following additional circuitry. A kernel latch 200 holds the address to use for kernel calling and can only be programmed by trusted code. It receives at its latch input a store kernel signal 202 to latch the kernel address on line 204. A kernel multiplexor 206 receives the kernel address at one input thereof and the normal start address on line 40 at the other input thereof. The kernel multiplexor 206 is controlled by a branch kernel signal on line 208. The branch kernel signal is asserted at the same time as the start signals 40 would normally be asserted to initialise a branch. When the signal is asserted, the address held in the kernel latch 200 is stored into the fetch latch 65 via multiplexor 206 and a further multiplexor 208, rather than the address supplied by the start signal.

The fetcher also includes a descriptor latch 210 which indicates whether the fetch pointer 65 holds an instruction address or a descriptor address. It is controlled by the descriptor signal on line 212. When the descriptor latch 210 indicates that the address is a descriptor address, it is loaded from data held in the buffer 66 via a pointer register 214. The multiplexor 208 controls whether the address supplied to the fetch pointer 65 is from the pointer register 214 or from the multiplexor 206. A descriptor indication unit 216 signals whether or not the buffer 66 holds enough information for the pointer register 214 to hold the correct descriptor address.

The fetcher of FIG. 7 is thus able to carry out kernel branches and descriptor branches.

Figure 8:
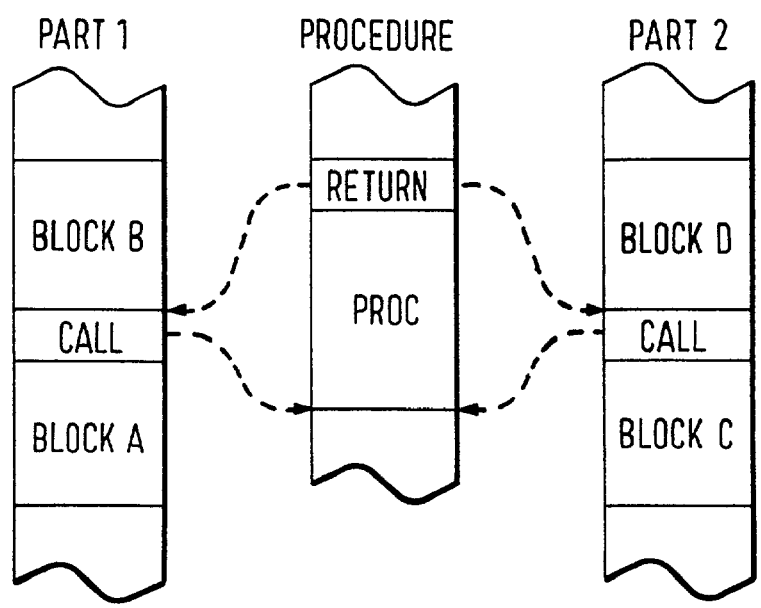
FIG. 8 is a schematic diagram illustrating procedure calling.

Another type of branch instruction is procedure calling. This requires that a suitable instruction pointer value is saved so that the procedure can return back to the piece of program from whence it came. Thus, the procedure can be called from different parts of the program. FIG. 8 illustrates the flow graph for a procedure call. FIG. 8 illustrates a program containing Part 1, Part 2 and Procedure. Part 1 has sequential blocks of instructions Block A, Block B between which is located a call instruction. Similarly, Part 2 has sequential blocks of instructions Block C, Block D between which is a call instruction. The procedure includes a sequence of procedure instructions PROC and a return instruction. The two pieces of code, Part 1 and Part 2 both call the Procedure and both return to their respective control flows. The call instruction can be implemented as a particular type of set or do branch instruction which not only identifies a target location (SET) or branch point (D0) but causes the return address of the first instruction of the, next sequential block to be saved in a return register. Then, the return instruction can be implemented as a particular type of set instruction which effects a branch to the return address which was held in the register.

Figure 9:
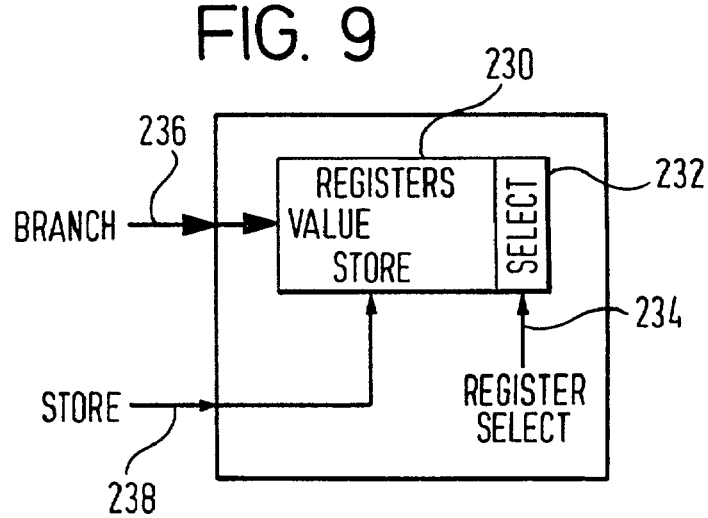
FIG. 9 is a sketch illustrating states for performing procedure calls.

FIG. 9 indicates the state register required to implement procedure calls. This includes registers 230 with a select register unit 232 controlled by a register select signal 234. On execution of a set or do branch (or call) instruction, the address of the next instruction after the call instruction to which the program is to return is stored in the registers 230 on branch line 236 responsive to the store signal 238. When the special set (or return) instruction is implemented, the branch is effected to the target location which is stored in the specified register 230.

Figure 10:
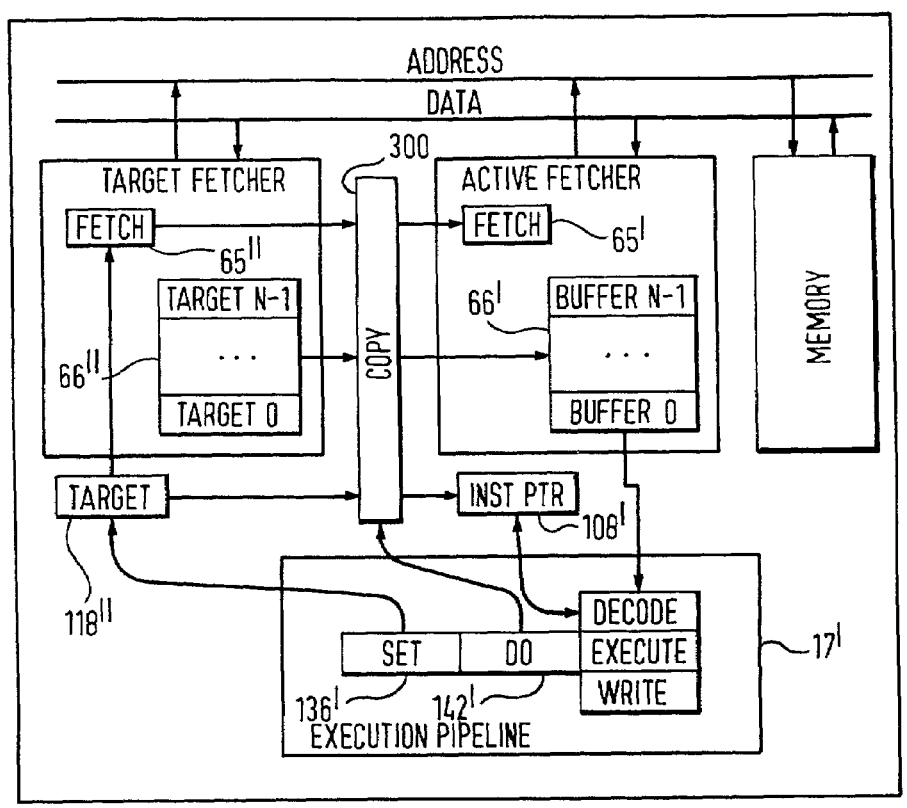
FIG. 10 is a block diagram illustrating an alternative implementation for an instruction fetch circuit.

In the above described embodiment, there are two instruction fetchers which can both function as the active fetcher depending on the state of the switch multiplexor. FIG. 10 illustrate in block diagram form an alternative embodiment where the instruction fetch circuit comprises two instruction fetchers, one of which is always the active fetcher. This embodiment will now more clearly be described with reference to FIG. 10. Like numerals in FIG. 10 denote like parts to FIG. 6, but primed. Thus, FIG. 10 illustrates a pipelined processor 17' including execution circuitry with a set branch instruction execution circuit 136' and a do branch instruction execution circuit 142'. There is an instruction pointer register 108' and a target pointer register 118'. The fetch circuit includes an active fetcher and a target fetcher. The active fetcher includes a fetch pointer 65' and an instruction buffer 66'. The target fetcher similarly includes a fetch pointer 65" and a target instruction buffer 66".

On execution of a set branch instruction, the target pointer register 118' is initialised to instruct the fetch pointer 65" of the target fetcher to commence fetching instructions from the target location. Meanwhile, the active fetcher is fetching instructions sequentially from memory and supplying them to the processor 17'. On execution of the effect branch instruction, a copy unit 300 acts to copy the contents of the target instruction buffer 66" of the target fetcher to the instruction buffer 66' of the active fetcher so that the next instructions to be supplied to the processor 17' are those commencing from the target location.

Figure 5:
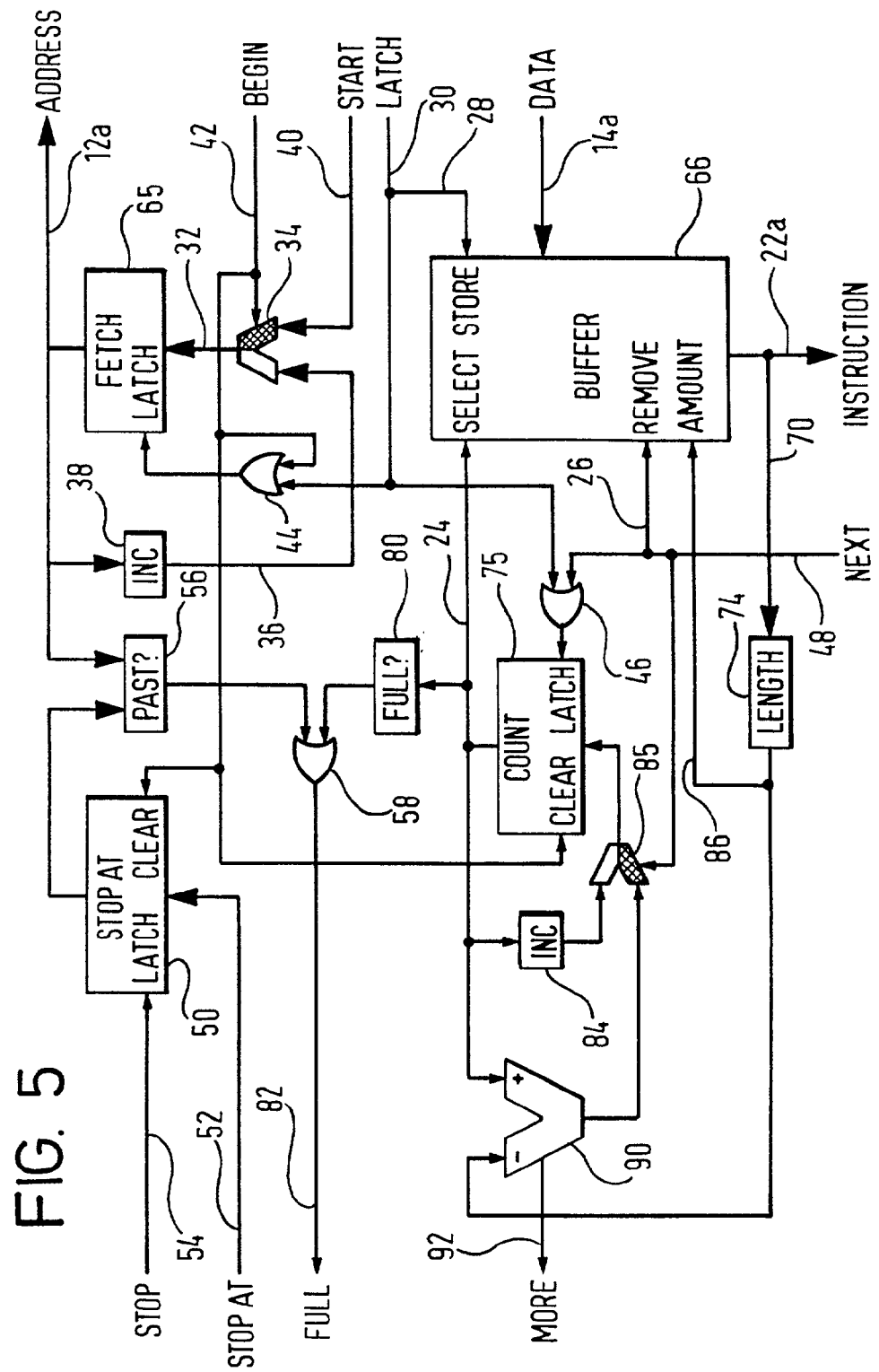
FIG. 5 is a circuit diagram of an instruction fetcher.
Figure 6:
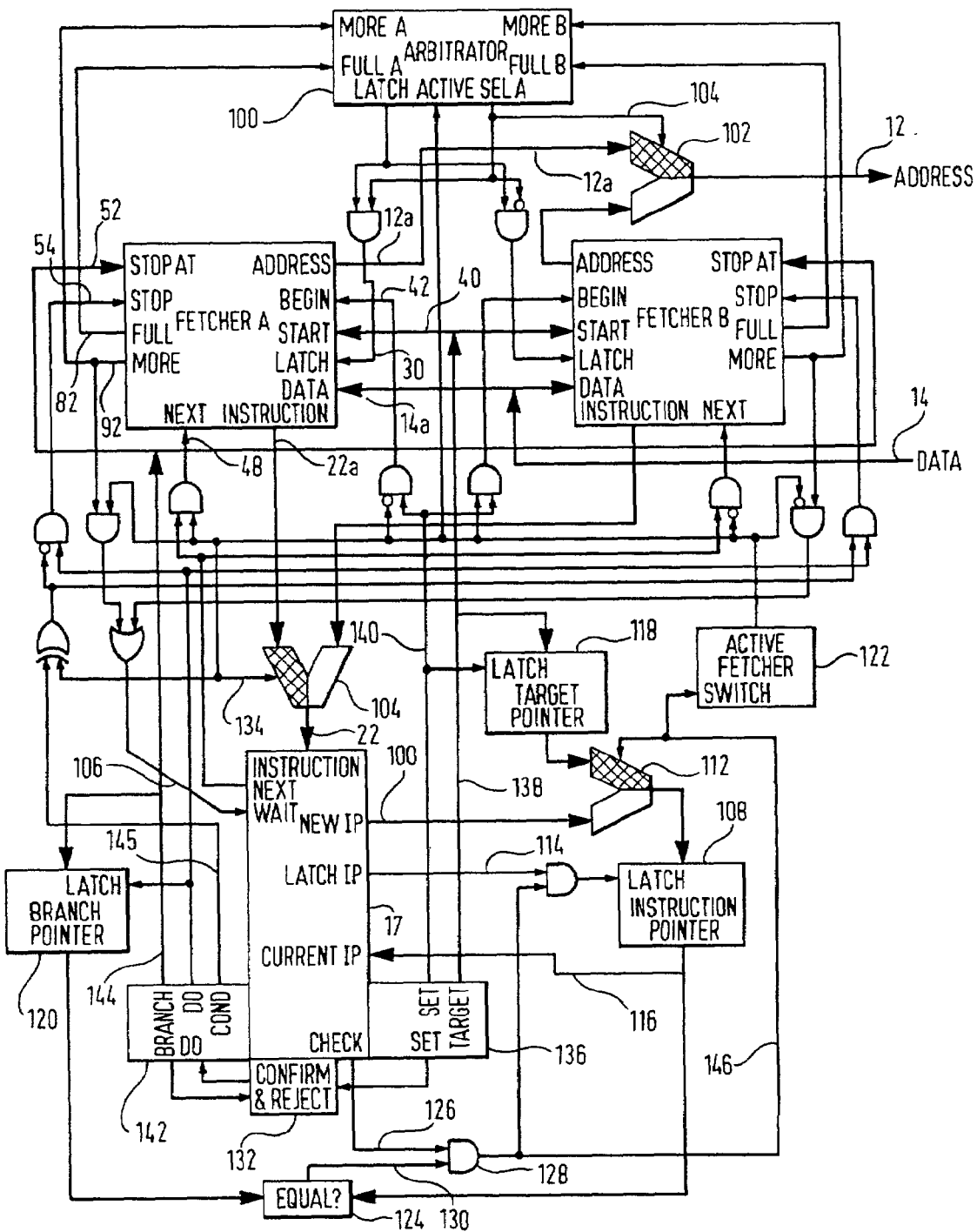
FIG. 6 is a circuit diagram of a computer system for implementing branch instructions.

Further details of implementation of the circuit of FIG. 10 are not given herein because it will be apparent from the information given in relation to the circuit of FIGS. 5, 6 and 7 how the circuit of FIG. 10 could be implemented.

What is claimed is:

1. A computer system comprising:
   storage circuitry for holding a plurality of instructions at respective storage locations, the plurality of instructions including a first string of instructions including a set branch instruction indicating a target location within the storage circuitry at which a new instruction, not included in the first string, is stored, the new instruction to be executed only if a branch condition is satisfied, and the first string further including a subsequent instruction that is subsequent in the first string to the set branch instruction;
   instruction fetch circuitry to fetch instructions from said storage circuitry, the instruction fetch circuitry including a first instruction fetcher to fetch instructions, including the subsequent instruction, from the first string, and including a second instruction fetcher; and
   execution circuitry to execute fetched instructions, including executing the set branch instruction,
   wherein the second instruction fetcher is operative, responsive to execution of said set branch instruction by the execution circuitry and irrespective of whether the branch condition is satisfied, to fetch the new instruction from the location indicated by the set branch instruction, in parallel to the first instruction fetcher fetching the subsequent instruction.

2. The computer system according to claim 1, wherein the first string of instructions includes a condition instruction which defines the branch condition.

3. The computer system according to claim 2, wherein the first string of instructions further includes an effect branch instruction for implementing a branch to the location indicated by the set branch instruction.

4. The computer system according to claim 3, the system further comprising select circuitry responsive to execution of the effect branch instruction to cause said execution circuitry to execute said new instruction if the branch condition defined by the condition instruction is satisfied.

5. The method of claim 4, wherein said select circuitry is operable to connect a selected one of said first and second instruction fetchers to said execution circuitry.

6. The computer system according to claim 3, wherein said instruction fetch circuitry comprises two instruction buffers, a first buffer, connected to said execution circuitry, to hold the further instructions to be executed, and a second buffer to hold a second string of instructions including the new instruction, wherein the computer system includes circuitry to copy the contents of said second buffer into said first buffer responsive to execution of said effect branch instruction.

7. The computer system according to claim 3, wherein said instruction fetch circuitry comprises a third instruction fetcher for fetching instructions to implement predicted conditional instructions.

8. The computer system according to claim 3, wherein said effect branch instruction is located at a branch point after which said new instruction is to be executed.

9. The computer system according to claim 8, wherein the computer system comprises a branch point register for holding said branch point.

10. The computer system according to claim 8, the computer system further comprising a return register for holding a return address being the address of the next instruction after said branch point, and wherein said set branch instruction identifies said return register to indicate the target location.

11. The computer system according to claim 1, wherein the target location holds an address of the new instruction, which is a first instruction of a string of new instructions to be fetched.

12. The computer system according to claim 1, wherein the branch instruction identifies a special register which holds an address from which a first instruction of a string of new instructions is to be fetched.

13. The computer system according to claim 1, wherein the target location holds an address of a memory location which holds an address of a first instruction of a string of new instructions to be fetched.

14. The computer system according to claim 1, further comprising decode circuitry for decoding said fetched instructions, said instruction fetch circuitry, decode circuitry and execution circuitry being arranged in a pipeline.

15. The computer system of claim 1, further comprising:
   a decode circuit to receive and decode fetched instructions, including the set branch instructions, and to supply the decoded fetched instructions, including the decoded set branch instruction, to the execution circuitry.

16. A method of operating a computer having storage circuitry holding a plurality of instructions at respective storage locations, said plurality of instructions being arranged in instructions strings including a first instruction string that includes a set branch instruction indicating a target location within the storage circuitry at which a new instruction, not included in the first string, is stored, the new instruction to be executed only if a branch condition is satisfied, and the first string further including a subsequent instruction that is subsequent in the first instruction string to the set branch instruction, the method comprising:
   fetching the subsequent instruction from said storage circuitry;
   executing said set branch instruction; and
   in response to executing said set branch instruction by execution circuitry and irrespective of whether the branch condition is satisfied, fetching the new instruction from said storage circuitry in parallel to fetching the subsequent instruction.

17. The method according to claim 16, further comprising:
   executing a condition instruction which defines a the branch condition.

18. The method according to claim 17, wherein the plurality of instructions includes a second instruction string including the new instruction, wherein the method further comprises:
   executing an effect branch instruction for implementing the branch;
   in response to executing said set branch instruction, holding the indication of said target location in a target store, fetching in parallel instructions from the first instruction string and from the second instruction string commencing from said target location;
   continuing to execute instructions from the first instruction string until the effect branch instruction is executed which indicates that further instructions to be executed are instructions from the second instruction string if the branch condition defined by the condition instruction is satisfied; and responding to said effect branch instruction by commencing execution of said instructions of the second instruction string.

19. The method according to claim 18, further comprising:

holding said instructions of the first instruction string in a first buffer; and holding said instructions of the second instruction string in a second buffer; and in response to execution of the effect branch instruction, copying the contents of said second buffer into said first buffer.

20. The method according to claim 18, wherein said instructions from the first instruction string are fetched by a first instruction fetcher and said instructions from the second instruction string are fetched by a second instruction fetcher, wherein the method further comprises:

selecting which of said first and second instruction fetchers supplies instructions for execution, based on said effect branch instruction.

21. The method according to claim 18, wherein the branch instruction identifies as the target location the address from which the first instruction of a string of new instructions is to be fetched.

22. The method of claim 16, further comprising:

prior to executing the set branch instruction, decoding the set branch instruction.

23. A computer system comprising:

storage circuitry for holding a plurality of instructions at respective storage locations, the plurality of instructions including a first string of instructions including a set branch instruction indicating a target location within the storage circuitry at which a new instruction, not included in the first string, is stored, the new instruction to be executed only if a branch condition is satisfied, and the first string further including a subsequent instruction that is subsequent in the first string to the set branch instruction;

execution circuitry to execute fetched instructions, including executing the set branch instruction; and means for fetching the subsequent instruction and the new instruction from the storage circuitry in parallel in response to execution of the set branch instruction by the execution circuitry and irrespective of whether the branch condition is satisfied.

* * * * *

UNITED STATES PATENT AND TRADEMARK OFFICE
CERTIFICATE OF CORRECTION

PATENT NO. : 7,047,399 B2            Page 1 of 1
APPLICATION NO. : 09/842312
DATED : May 16, 2006
INVENTOR(S) : Andrew C. Sturges and Nathan M. Sidwell It is certified that error appears in the above-identified patent and that said Letters Patent is hereby corrected as shown below:

Col. 3, line 28, should read:
--provided a computer system for fetching, decoding and--

Col. 4, line 32 should read:
--selected one of said instruction fetchers to said execution--
line 44, should read:
--can be done in a number of ways. For example, a further--
line 49 should read:
--register can then be compared with an instruction pointer--

Col. 6, line 8 should read as shown below:
--commencing from a target location. The rejected state is one--

Col. 17, line 55 should read:
--kernel signal is asserted at the same time as the start signal--

Signed and Sealed this

Fifteenth Day of August, 2006

JON W. DUDAS
*Director of the United States Patent and Trademark Office*